May 16, 1961 R. ROSEBROOK 2,984,259
VALVE AND METHOD FOR MAKING THE SAME
Filed Sept. 8, 1958
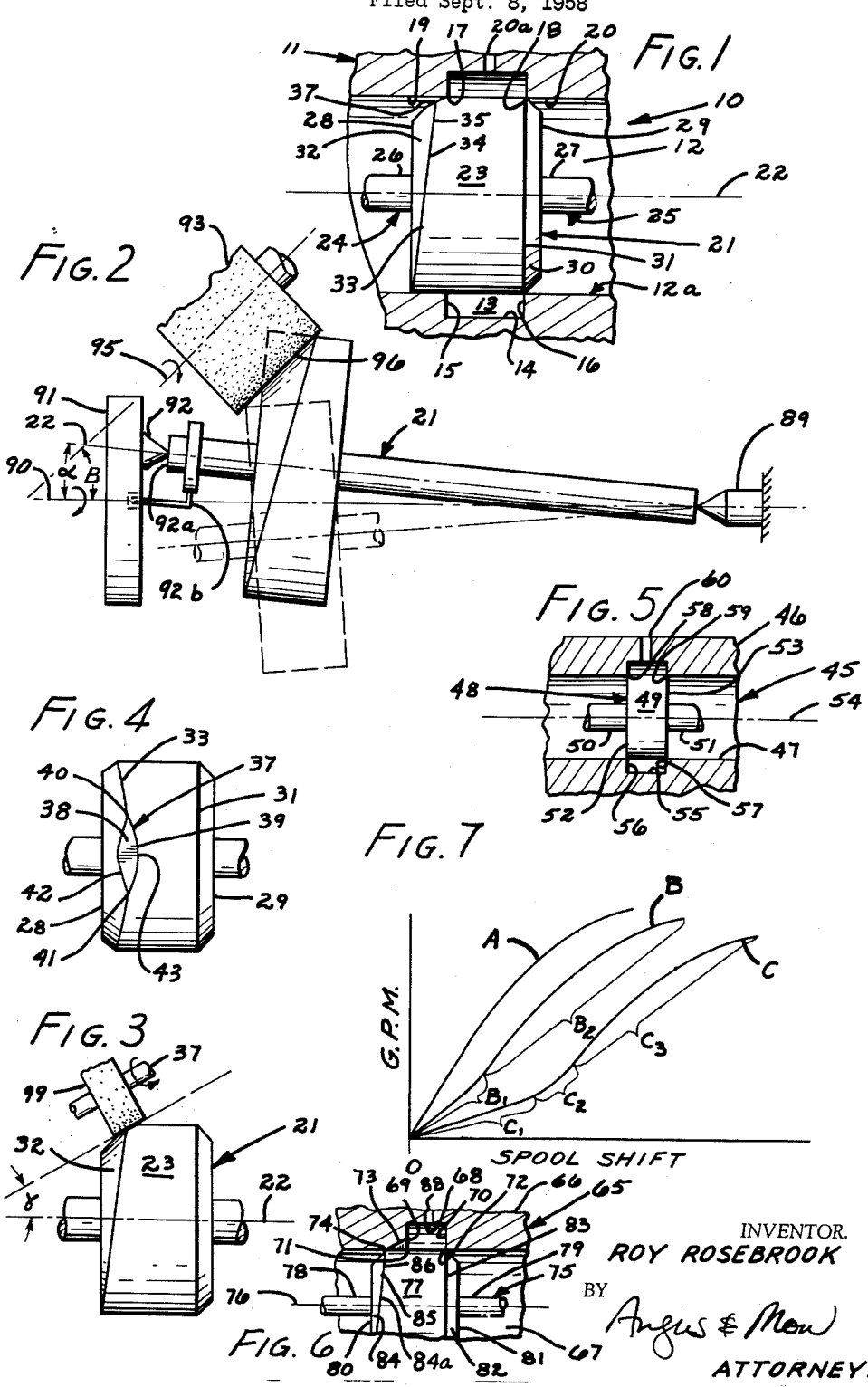
INVENTOR.
ROY ROSEBROOK
BY
Angus & Mon
ATTORNEY.

United States Patent Office 2,984,259
Patented May 16, 1961

2,984,259

VALVE AND METHOD FOR MAKING THE SAME

Roy Rosebrook, Montebello, Calif., assignor, by mesne assignments, to Banstrom Industries, Inc., Los Angeles, Calif., a corporation of Connecticut Filed Sept. 8, 1958, Ser. No. 759,643

3 Claims. (Cl. 137—622)

This invention relates to spool valves for the control of fluid flow.

Spool valves are frequently used to control the flow of hydraulic fluid to motor means that adjust the relative position of massive machine tool elements. An example of such an application is a tracer valve which controls motors for shifting the worktable of a milling machine. A valve of this general type, with an illustration of its application to a machine tool, is disclosed in Rosebrook Patent No. 2,753,145, issued July 3, 1956.

As shown in that application, it has been customary to utilize spool valves in which control edges at the margins of the various grooves are circular and normal to the spool axis, so that the entire periphery of a control edge will open or cut-off at once. With such an arrangement, flow of fluid will begin all the way around the edge as soon as the grooves adjacent to the control edges are in registration. Accordingly, a very slow flow rate through this valve can be obtained only by making extremely small spool displacements in the valve.

When close control of machines becomes dependent on very tiny movements of a spool, a number of problems arise, not the least of which is the tendency of these orifices to silt up because of their tiny size. Another problem resides in the large pressure drop across such a small orifice, so that the output pressure often does not start the fluid motor being operated. Then the pressure at the downstream side of the orifice is built up gradually, usually by virtue of a considerable over-deflection of the stylus which controls the valve, until sufficient pressure builds up to overcome the standing friction of the motor. Then, when the motor starts to run, the stylus is over-deflected and a rapid compensation occurs which causes a chattering that spoils the finish of the work.

To avoid these and other problems, numerous attempts have been made to "tailor" the shape of the control edges in spool valves. These attempts, while being of some help, have not solved all of the problems inherent in these devices. For example, in applicant's co-pending application, Serial No. 628,820, filed December 17, 1956, entitled "Spool Valve," there is disclosed a spool valve and a method of making the valve in which the control edge is slanted relative to the central axis of the spool. This results in a gradual overlap between the control edges as the valve opens and closes, so that there is a smooth, gradually increasing flow orifice which opens and closes at a slower rate than an orifice formed by circular edges, and in which the axial length of the opening for a same flow orifice of the same area is so much larger than that formed by a pair of circular edges, that there is little if any tendency for the opening to silt up.

While the improvement shown in the said co-pending patent application has resulted in considerably improved operation of machine tools, it has been found that it still does not provide a completely suitable flow orifice immediately adjacent to the cutoff condition. Accordingly, an object of this invention is to provide in combination with a control edge in a spool valve, an additional flow restriction means which tends to slightly advance the operation of the control edge and to form a more gradual opening and cutoff action than has heretofore been possible.

According to this invention, a spool valve comprises a valve sleeve and a valve spool. These are provided with grooves which are bounded by control edges. The grooves are out of communication when the control edges overlap each other, so that lands of the sleeve and spool are in sealing contact. Fluid can flow through from groove to groove when the control edges are spaced from each other and overhang a groove in the opposite valve element (underlap). The control edge on one of these elements is provided with points which are spaced both radially apart and axially apart so that they sequentially overlap a co-acting circular edge on the other element, and a control edge is provided with a by-passing channel means.

The invention, and its various features, will be fully understood from the following detailed description and the accompanying drawings, of which:

Fig. 1 is a side elevation partly in cutaway cross-section showing the preferred embodiment of the invention;

Fig. 2 is a side elevation showing the first step in the preferred method of manufacturing the element of Fig. 1;

Fig. 3 shows the final step of manufacturing the device of Fig. 1;

Fig. 4 is a top view of a spool produced by the steps of Figs. 2 and 3;

Fig. 5 is an illustration of a conventional spool valve construction;

Fig. 6 is a side elevation partly in cutaway cross-section showing an alternate embodiment of the invention; and Fig. 7 is a graph showing the flow characteristics of the spool valve of Figs. 1 and 5.

In Fig. 1 there is shown a spool valve 10 which is the presently preferred embodiment of the invention. The spool valve comprises a valve sleeve 11 having a central spool passage 12 with a cylindrical inner wall 12a. In this wall there is cut a sleeve groove 13, the groove being generally a circular cylinder, having a cylindrical bottom 14 and two flat annular shoulders 15, 16, which respectively intersect the wall of the spool passage to form control edges 17, 18. These edges leave lands 19, 20, one on each side of the groove, adjacent to the control edges 17, 18, respectively. A conduit 20a passes through the sleeve from groove 13.

Within the valve sleeve there is a valve spool 21. Only a portion of the valve spool is shown. The spool and the sleeve are adapted for relative axial reciprocation along an axis 22 which is the central axis of both the spool passage and the valve spool. The spool has a land 23 which is bounded by a pair of grooves 24, 25. The term "groove" is used in the sense of a portion of the spool which is radially recessed from the land 23, the bottom being shown by the segments 26, 27, respectively.

The grooves are bounded by annular shoulders 28, 29, shoulder 29 including a chamfer 30 which intersects land 23 to form a control edge 31. It will be observed that control edges 17, 18 and 31 are circular and lie in planes which are perpendicular to the central axis 22.

Shoulder 28 includes a canted surface 32 which intersects with the land 23 to form a control edge 33. For convenience in definition, canted surface 32 is said to connect the shoulder and land 23. A control edge suitable for this purpose may have numerous configurations, but the preferred form is as shown, which is an ellipse that lies in a plane which is oblique (non-perpendicular) to the central axis 22. The operative feature of control edge 33 is that there is a plurality of adjacent points such at 34, 35, which are both radially spaced around the control edge 33 and are axially spaced relative to the central axis 22.

Channel means 37 fluidly interconnect the canted surface 32 and the land 23. The preferred channel means is best shown in Fig. 4 and constitutes a ground flat surface 38 which modifies the control edge 33 at its extreme right hand position so as to have a segment 39 which intersects the control edge 33 at points 40 and 41, segment 39 in effect forming a continuation of the control edge. Segment 42 is the intersection of the channel means and the canted surface. It will be seen that the channel means has at least one point, designated by the numeral 43, which is axially advanced ahead (to the right in Fig. 4) of any point on the control surface 33.

Fig. 5 is an illustration, for purposes of comparison, of a conventional spool valve 45 which comprises a sleeve 46 with a spool passage 47 therethrough. A valve spool 48 is disposed within the passage 47 and has a land 49 bounded by grooves 50, 51 which form control edges 52, 53 that are continuous circular edges which lie in planes perpendicular to the central axis 54 of the spool, this central axis 54 also being the central axis of the spool passage.

In the wall of the spool passage there is a sleeve groove 55 bounded by flat annular shoulders 56, 57 that intersect the wall of the spool passage to form control edges 58, 59 which are circular and which lie in planes perpendicular to the central axis of the spool passage. A conduit 60 passes through the sleeve to communicate with the sleeve groove 55.

In Fig. 6 there is shown an alternate embodiment of a spool valve according to this invention. In this embodiment, a spool valve 65 comprises a valve sleeve 66 having a spool passage 67 with a groove 68 in its wall that is bounded by flat annular shoulders 69, 70 which form control edges 71, 72 with the inner wall of the spool passage. Control edge 71 is modified by a channel means 73 which interconnects shoulder 69 with the wall of the spool passage. In this case, the channel means comprises a flat surface milled or ground into the control edge 71, the channel means thereby having at least one point 74 which is advanced ahead of control edge 71, that is, to the left in Fig. 6.

A valve spool 75 is slidably disposed within the spool passage. It has a central axis 76 in common with the spool passage. A land 77 on the spool is adapted to slide along the inside wall of the spool passage. This land is bounded by grooves 78, 79. The grooves are bounded by shoulders 80, 81. Shoulder 81 is modified by a chamfer 82 which intersects the land to form a control edge 83. It will be observed that control edge 72 on the sleeve and edge 83 on the spool are circles which lie in planes normal to the central axis 76. Except for the channel means portion, control edge 71 is also a circle lying in a plane perpendicular to the central axis.

Shoulder 80 is modified by a canted surface 84 which intersects the land 77 to form an edge which lies in a plane that is slanted relative to the central axis. Control edge 84a is formed by the intersection of the land and shoulder 80. It is an ellipse, and has the feature that it has a plurality of adjacent points such as 85, 86 which are both radially spaced from each other and are axially spaced along the central axis.

In Fig. 6 the channel means is formed in one of the control edges in the valve sleeve rather than in the valve spool as shown in the embodiments of Figs. 1 and 4. A conduit 88 passes through the valve sleeve to provide for fluid communication from the outside of the valve to the groove 68.

The preferred means for manufacturing the canted surfaces 32 and 84 is shown in Fig. 2. Fig. 2 will be discussed with particular reference to the spool embodiment of Figs. 1 and 4, and corresponding parts will bear like numbers. The spool 21 is shown chucked up in a grinder between a center 89 which lies on the axis of rotation 90 of the grinder, and a rotary head 91. This rotary head may conveniently be the well known "Criterion" head which includes a center 92 for engaging an end 92a of the spool. A dog 92b constrains the spool to rotate with the head. Center 92 is effective at a point laterally displaced from the axis of rotation. It will thereby be seen that the central axis 22 of the valve spool is disposed at an angle $\alpha$ to the axis of rotation of the grinder. Therefore, rotation of the rotary head will cause the spool to trace a conical path in space, two extremes of which are shown in Fig. 2. One extreme is shown in solid-line, where the spool is closest to a grinding wheel 93, and another extreme is shown in dashed-line wherein the spool is at its farthest removed reach from the grinding wheel, this latter position being achieved when the rotary head has turned 180°.

The grinding wheel 93 has a central axis 95 and a grinding surface 96. The grinding surface and axis 95 are disposed at an angle $\beta$ to the axis of rotation of the grinder.

It will be seen that as the grinder is rotated around its axis, the valve spool undergoes a "wobbling" motion. While undergoing this motion, the spool is brought into contact with grinding surface 96 to form the canted surface. Each canted surface is a segment of a cone disposed at an angle to the central axis of the spool. The intersection of the cylindrical land and of this conical surface is the elliptical control edge 33.

Once this elliptical control edge is formed, the spool is removed to a conventional surface grinder in which the channel means may conveniently be formed in the manner shown in Fig. 3. As shown, the spool 21 is subjected to the operation of a grinding wheel 99 whose grinding edge is moved across the control edge 33 while maintaining an angle $\gamma$ with respect to the central axis 22 of the spool. This grinds a flat land which acts as channel means interconnecting land 23 with canted surface 32. The grinding wheel 99 moves across the canted surface along an axis perpendicular to the plane of Fig. 3.

The sleeve of Fig. 6 is prepared by grinding channel means as shown. Spool 75 as used in this embodiment is the spool which results from the manufacturing step shown in Fig. 2.

The flow characteristics of spool valves such as shown in Figs. 1, 5 and 6 are set forth in the graph in Fig. 7. The flow characteristics of the valve of Fig. 6 are identical with those of Fig. 1.

Graph A in Fig. 7 shows the flow characteristics of a conventional spool valve of the type shown in Fig. 5, wherein all of the control edges are circular and lie in planes that are normal to the central axis of the valve. In this graph, the ordinate represents the flow-rate in volume per unit time. The abscissa represents spool shift relative to the sleeve; that is, relative movement between the valve elements. The origin, zero, represents a neutral, or closed position where no parts of either control edge overlap, and the abscissa positions to the right of the origin represent an increasing degree of overlap of opposed control edges.

Graph A rises at a rapid slope from the origin. Even though the graph is slightly curved, the relationship between the flow rate and the spool shift is fairly close to a first-power direct proportion. It is the quick rise in flow rate with spool shift, represented by the steep slope, that occurs because of the large peripheral orifice between circular control edges which makes it so difficult to control machine tools at low rates with conventional spool valves.

Graph B shows the characteristics of a valve spool manufactured as shown in Fig. 2, but without the additional channel means according to this invention. It will be seen that there is a gradual rise immediately adjacent the origin, in the segment designated B1. This segment relates to the valve characteristics while the slanted control edge is gradually overlapping the opposed circular control edge. After these edges completely pass each other, the slope of graph B generally matches that of graph A, because in this segment designated B2, the orifice is then substantially a ring.

Graph C illustrates the improvement obtainable by this invention, and shows the characteristics of the valve of Figs. 1 and 6. From neutral, there is an initial segment C, with a very gradual initial slope (which can be varied by adjusting the slope, length and width of the channel means). This represents the conditions when only the channel means overlap the opposed circular control edge. The next segment, C2, rather closely matches segment B1, because this region is controlled by the elliptical part of the control edge. The third segment, C3, rather closely matches segment B2, and graph A, because the orifice then formed is substantially a ring.

It will be noted that segment C1 of graph C provides a very slowly opening orifice over a significantly great relative movement of the spool and sleeve.

Graphs A, B and C are not drawn to any particular scale, and their exact shape and slope would, of course, vary with a number of parameters, such as pressure, spool diameter, and the like. They are essentially schematic, and are for the sole purposes of illustrating the general properties of the valves disclosed herein.

It will be understood that there are many modifications of this invention. For instance, there can be more than one channel means and also the channel means can be disposed at points other than the farthest advanced part of the control edges.

With respect to the initial flow through the improved valves of the type shown in Figs. 1 and 6, it will be understood that the small orifice formed by the channel for passing fluid at a slow rate is not of a shape which will tend to silt up. This is for the reason that the orifice is formed in a slit which extends only over a very small portion of the entire periphery of the spool; that is, the area is "bunched up," rather than spaced around the entire periphery of the spool. In order to pass the same small amount in a spool valve of the type shown in Fig. 5, it would be necessary for the spool to have an extremely small spool displacement and to have an almost microscopic annular orifice all the way around the spool. Such a small opening tends to silt up even when filters as fine as 10 microns are used in the hydraulic system. This arrangement also tends to reduce the pressure drop across the control edges.

This invention thereby provides a valve which enables a valve spool to have a significant axial displacement and put out only a fairly small flow, or stated otherwise, with a small displacement a proportionately small rate of fluid flow will result, but through an orifice of the type which does not have the undesirable side effects present in conventional spool valves.

This invention is not to be limited by the embodiments shown in the drawings and described in the description which are given by way of illustration and not of limitation, but only in accordance with the scope of the appended claims.

What is claimed is:

1. In a spool valve of the type which includes a sleeve having a spool passage, said passage having an axis, a cylindrical sleeve land on the wall of said passage, and a circumferential sleeve groove in said wall adjacent to said sleeve land, said sleeve groove being bounded by a shoulder which defines a sleeve control edge at its intersection with the sleeve land, and a valve spool in said spool passage, said valve spool having a central axis coincident with the central axis of the spool passage, the valve spool having a circumferential spool land and a circumferential spool groove adjacent to said spool land, said spool groove being bounded by a shoulder which defines a spool control edge at its intersection with the spool land, the lands being circularly cylindrical and able to make a fluid sealing fit with each other, the valve spool and valve sleeve being axially movable relative to each other, whereby fluid communication between the grooves is cut off when the control edges overlap, and there is formed a flow orifice between the control edges when they underlap, the improvement comprising: a canted surface interconnecting the shoulder on the spool with the spool land, the spool's control edge being an ellipse lying at an oblique angle to the axis, adjacent points on said ellipse being radially and axially spaced from each other, the sleeve's control edge being a circle lying normal to the axis, channel means extending axially on the valve spool connecting the land and the canted surface, by-passing that part of the spool's control edge which lies axially farthest from the spool shoulder, thereby providing limited communication between the spool groove and the spool land without passing over the spool's control edge, whereby upon axial sliding of the spool away from an overlapped condition of the control edges, the channel means provides an initial low-rate flow orifice between the grooves, and upon further sliding, the control edges progressively underlap, thereby providing a gradually increasing flow orifice between the grooves.

2. A spool valve according to claim 1 in which the canted surface is a fragment of a cone, and in which its intersection with the spool's control land forms the said ellipse.

3. A spool valve according to claim 1 in which the channel means comprises a flat surface.

References Cited in the file of this patent

UNITED STATES PATENTS

| | | |
|---|---|---|
| 2,480,403 | Ferris | Aug. 30, 1949 |
| 2,544,209 | Wolcott | Mar. 6, 1951 |
| 2,602,437 | Tancred | July 8, 1952 |
| 2,702,529 | Doerfner | Feb. 22, 1955 |
| 2,705,829 | Mock | Apr. 12, 1955 |
| 2,783,745 | Stephens | Mar. 5, 1957 |